United States Patent [19]

Lynch

[11] 4,162,973

[45] Jul. 31, 1979

[54] WATER POLISHING SYSTEM

[75] Inventor: William M. Lynch, Glen Ellyn, Ill.

[73] Assignee: AFL Industries, Inc., West Chicago, Ill.

[21] Appl. No.: 802,814

[22] Filed: Jun. 2, 1977

[51] Int. Cl.² .................... B01D 21/24; B01D 29/36; B01D 29/38; B01D 35/12

[52] U.S. Cl. .................. 210/73 W; 210/22; 210/102; 210/108; 210/142; 210/259; 210/333 A; 210/341

[58] Field of Search ............... 210/23 R, 73 O W, 82, 210/108, 259, 333 R, 333 A, 341, 142, 102; 55/165

[56] References Cited

U.S. PATENT DOCUMENTS

| | | | |
|---|---|---|---|
| 2,988,221 | 6/1961 | Culp | 210/104 |
| 3,339,736 | 9/1967 | Muller | 210/333 |
| 3,907,681 | 9/1975 | Corrigan et al. | 210/108 |
| 3,933,654 | 1/1976 | Middelbeek | 210/23 R |
| 3,937,662 | 2/1976 | Bartik | 210/23 R |
| 4,029,114 | 6/1977 | Wiltrout | 210/108 |

FOREIGN PATENT DOCUMENTS 688203  6/1964  Canada ...................... 210/108

Primary Examiner—Charles N. Hart
Assistant Examiner—David R. Sadowski
Attorney, Agent, or Firm—Hill, Van Santen, Steadman, Chiara & Simpson

[57] ABSTRACT

Waste water containing pollutants such as suspended solids and emulsified oil is pumped continuously through a self-contained separating or polishing system utilizing a simplified plug-in module to remove the pollutants. The suspended solids are removed by mechanical filtration and the emulsified oil is separated by coalescing oil into floatable droplets which can be skimmed from a water surface and withdrawn for external accumulation. The treated waste water may be returned for further use or pumped to other facilities for further treatment.

18 Claims, 7 Drawing Figures

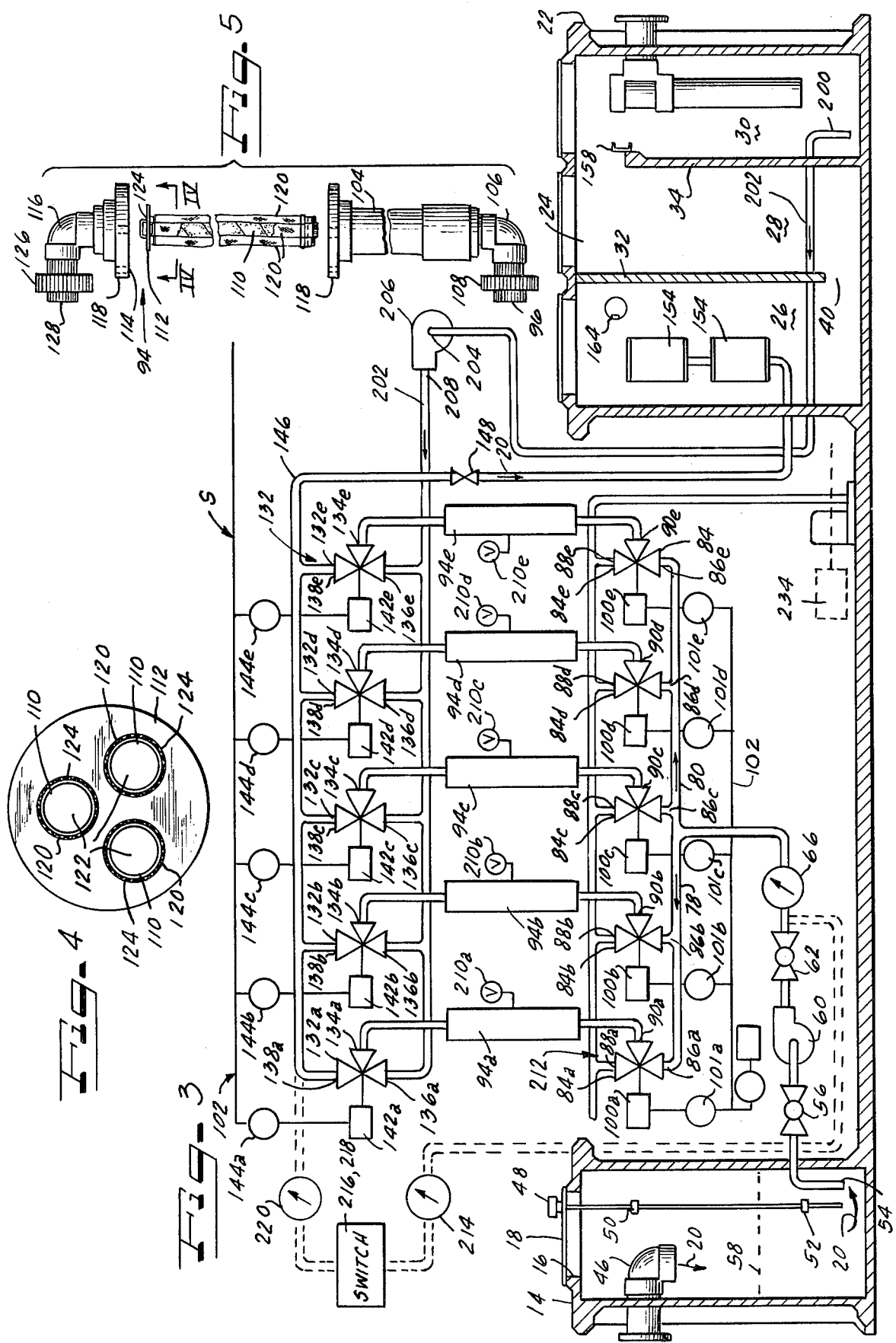

WATER POLISHING SYSTEM

BACKGROUND OF THE INVENTION

1. Field of Invention

This invention relates generally to water pollution control systems and related apparatus. As water is used, particularly in connection with contemporary technology, the water becomes polluted as solids, foreign liquids, oils and greases become mixed with the water. Environmental awareness, evidenced by governmental laws and pursuant regulations, now requires that users treat waste water to remove pollutants before water may be returned or dumped into a stream or municipal storm sewer or sewage system.

2. Description of the Prior Art

The techniques for removing solids and other insoluble materials from waste water are well known to the art. For years, however, some users ignored the presence of such pollutants before disposing of the water as waste, relying on nature to dispose of the pollutants in some unforeseen way. The polluters of water applied the pollution theory of "ashes to ashes and dust to dust." As environmentalists made the public aware of the detriment to the ecology of the earth that such a policy was causing, legislation was passed to curb such activities. As a result, the need for pollution control equipment greatly expanded particularly for the smaller business entrepreneur who had previously no need for extensive settling basins and the like since his activities likely to produce pollution were of such a diminutive nature. Heretofore, economical, standardized, factory-built, compact unit incorporating known techniques in a unique combination to suit a particular environmental situation was not readily available.

SUMMARY OF THE INVENTION

Waste water containing solids and other insoluble pollutants such as oil is first pretreated for removal of settable solids and free oil. Separation of these pollutants is obtained by allowing the waste water to remain in a holding area for a sufficient time period that solids are gravitationally settled to a bottom of the area and the free oil floats upward because of its relatively lower specific gravity. An API (American Petroleum Institute) gravity separator which provides for such separation.

With such pollutants separated and removed, waste water is then ready to be processed by apparatus as incorporated in this invention. Further purification or polishing of the waste water removes suspended solids and emulsified oils which were not separated in the previously noted treatment.

Waste water produced by a user may vary considerably as to total amount, amount per period of time, amount of suspended solids per volume of water and amount of emulsified oil per volume of water. The size of the various components within a polishing system will vary from installation to installation depending on these variables. A user may produce waste water in such quantities and in such a continuous manner that the system must operate continuously, or the system may need to be operated only intermittently to provide required separation upon accumulation of a certain quantity of waste water.

The system is self-contained with a self-supporting framework allowing the user to locate the system as desired and only make external connections.

The waste water enters the system where it first may be stored in an appropriately sized surge tank. Then the waste water is pumped through a filtering arrangement comprising a plurality of filter units connected in parallel. At least one of these filter units, however, is in a standby or non-operating state.

From the filter units the waste water then passes into a plurality of coalescers submerged within a coalescing and oil accumulation portion of a second tank filled with the waste water. The coalescers cause particles of suspended oil to accumulate and form into sufficiently large droplets, that as the oil droplets are forced from the coalescers, the droplets rise to a surface of the waste water within the accumulation portion of the tank. As the film of oil grows on the surface, it is selectively skimmed therefrom.

From the coalescers the waste water flows in a downward direction and through a submerged opening into a downstream weir portion of the tank having a weir partition as one wall of the tank. The waste water flows over the weir partition and into a clean water chamber where it may be gravity fed or pumped into a connecting sewer or other external accumulation means.

When the operative filter units become sufficiently contaminated with solid materials collected thereon, these filters must be backwashed.

In accordance with this invention, a backwash sequence is initiated by a high pressure drop across the filters. First, the non-operating filter unit is brought on line and then each of the previously operative filter units are individually taken out of service, backwashed and then brought back on line in a sequential manner until all the units have been backwashed.

Although the principles of operation are relatively simple, the achievement of a working system requires a complex arrangement of piping, pumps, valving and interconnecting controls which react to system failures, sense system conditions and initiate appropriate response upon such a failure or sensed condition.

Timing and sensing sequences become critical if the system is to be fully automatic and thus minimize human input into its operation.

By this invention, the module control concept has been applied to pollution control. The user need only plug in the module.

BRIEF DESCRIPTION OF THE DRAWINGS

FIG. 3 is a schematic diagram of the system as shown in FIGS. 1A and 1B;

FIG. 4 is an enlarged sectional detail view of a filter unit used in the system taken substantially along the line IV—IV in FIG. 5; and FIG. 5 is an exploded detail view of the filter unit and how it is adapted to be connected in the system.

DESCRIPTION OF THE PREFERRED EMBODIMENT

Figure 1A:
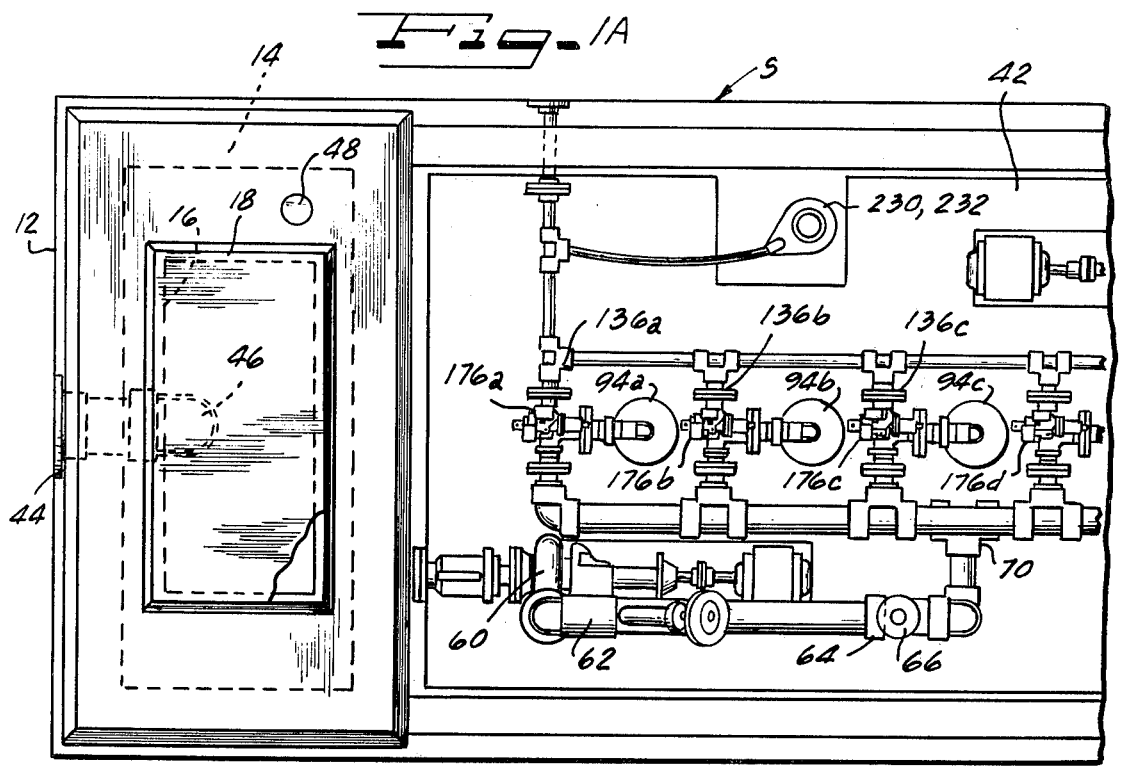
FIGS. 1A and 1B together are a plan view of the system which, because of its size and complexity, requires it be shown in two views.

A polishing system S includes a self-contained, portable module support structure 10 having an inlet end 12 where is located an inlet surge chamber 14 having a top opening 16 covered by a removable cover 18. This surge chamber 14 is optional, and as its name suggests ensures a steady flow of waste water 20 into the system S.

Where there is a large reservoir of the waste water 20 held in an appropriate holding area upstream from the system S, the inlet surge chamber 14 may not be required.

It also should be understood that the system S can be placed within a fully enclosed container which has appropriate openings to allow access to the various components of the system S as required.

At an outlet end 22 of the support structure 10 is a coalescing and outlet chamber 24 divided into a coalescing and oil accumulation portion 26, a weir portion 28 and a clean water portion 30 formed within the coalescing and outlet chamber 24 by an oil retention baffle partition 32 and a weir partition 34. The oil retention baffle partition 32 is not full height but has a bottom edge 36 spaced above a bottom 38 of the chamber 24 to provide an opening 40 between the coalescing portion 26 and the weir portion 28.

Between the surge chamber 14 and the coalescing and outlet chamber 24 is an apparatus portion 42 where various pumps, filter units, valving and piping are located and described in detail subsequently.

The construction of the support structure 10, the surge chamber 14 and coalescing and outlet chamber 24 can best be made as an integral unit utilizing a wooden framework enclosing cellular panels. This combination then is sprayed with a resin containing reinforcing fiber to form a rigid, weather-resistant structure. Such a construction is disclosed in U.S. Pat. No. 3,920,524 owned by the assignee of the present invention.

The waste water 20 enters the polishing system S having been treated previously to remove settable solids and free oil therefrom. The polishing system S anticipates that at least a gross separation has occurred so that the settable solids and free oil have been removed from the waste water.

The surge chamber 14 contains an inlet 44 to receive the inflow of the waste water 20 and connects with an elbow 46 so that the waste water 20 is directed downward in the surge chamber 14. The chamber 14 also contains a level sensing and control device 48 having a high level cutoff point 50 which controls the inflow of the waste water 20 in the chamber 14 to prevent an overflow condition, and a low level control point 52 to shut down the system S if a level 58 of the waste water 20 within the chamber 14 falls below the point 52.

From the surge chamber 14 the waste water 20 is drawn into an intake 54 and through a system cutoff valve 56 by a waste water pump 60. The pump 60 then drives the waste water 20 through a metering valve 62 and into a flow meter socket 64 in which a flow meter 66 may be optionally installed. The metering valve 62, in connection with the flow meter 66, allows a user to adjust the flow rate of the waste water 20 through the system S as desired.

From the flow meter socket 64 the waste water 20 is pumped to a T-fitting 70 having a common inlet 72 and a first outlet 74 and a second outlet 76 which divides the flow of the waste water 20 into two flow paths 78, 80 (FIG. 3) having approximately equal volumes per unit of time.

Each flow path 78 and 80 connects in parallel with a plurality of first 3-way valves 84 each having a waste water inlet port 86, a backwash outlet port 88 and a combination waste water outlet-backwash inlet port 90. The combination inlet-outlet ports 90 connects respectively, with a like plurality of elongated filter units 94 through an appurtenance 96 (FIG. 5) located in a bottom end of each unit 94.

Each of the 3-way valves 84 is operatively connected to a respective one of a plurality of actuators 100, which by means of an air supply 102 selectively connected through a like plurality of first air valving means 101 can selectively open a flow path in any valve 84 between the waste water inlet port 86 and the combination outlet-inlet port 90, and at the same time shut a flow path between the combination outlet-inlet port 90 and the backwash outlet port 88; or, the actuators 100 can reverse the open and closed flow paths noted above.

In the exemplary embodiment as shown, there are five 3-way valves designated 84a, 84b, 84c, 84d and 84e having waste water inlet ports, backwash outlet ports and combination waste water outlet-backwash inlet ports designated 86a–e, 88a–e and 90a–e, respectively. The combination ports 90a–e of the 3-way valves 84a–e connect respectively with the filter units designated 94a–e.

The plurality of filter units 94 each have an outer filter casing or body 104 which connects with the bottom appurtenance 96 through a bottom L-fitting 106 which in turn is connected to a bottom releasable fitting 108 which forms the appurtenance 96 in the filter unit 94.

Within the filter casing 104 (FIG. 5) are three elongated, cylindrically-shaped hollow stainless steel foraminous filters 110 (FIG. 4) which are held in a triangular relationship by a cover plate 112 which fits within a recess 114 in a top L-fitting 116. The top L-fitting 116 is joined to the filter body 104 by a suitable flange means 118, through which extend fasteners such as nuts and bolts so as to provide a readily disconnectable joint and thus easy access to the filters 110.

The cover plate 112 blocks the waste water 20 from flowing through the recess 114 except after first flowing through a filter surface of a fiber filter 120 provided for each corresponding stainless steel filter 110, and into an inner space 122 within the filter 110 and then upward through holes 124 in the cover plate 122. The top L-fitting 116 likewise connects with a like top readily releasable fitting 126 which forms a top appurtenance 128 in the filter unit 94.

Connecting with the top appurtenance 128 of each filter unit 94 is one of a like plurality of second 3-way valves 132 which, in the exemplary embodiment, are designated as 132a, 132b, 132c, 132d and 132e. Each 3-way valve 132a–e has a respective combination waste water inlet-backwash water outlet port 134a, 134b, 134c, 134d and 134e, a respective backwash water inlet port 136a, 136b, 136c, 136d and 136e and a respective waste water outlet port 138a, 138b, 138c, 138d and 138e.

Each of the second 3-way valves 132a–e likewise is operatively responsive to a respective one of plurality of actuators 142 which are in turn connected to the air supply 102 through a second air valving means 144, and in the exemplary embodiment the actuators and second air valving means are designated 142a–e and 144a–e, respectively.

By means of these actuators 142, a flow path between the combination port 134 and the waste water outlet port 138 can be opened and a flow path between the backwash water inlet port 136 and combination port 134 be closed; or, the actuators 142 can reverse the open and closed flow paths noted above.

When the 3-way valves 84 and 132 provide a flow path between the waste water inlet port 86 and the waste water outlet port 138, the respective 3-way valves 84 and 132 and filter 94 are in an operative mode. When the 3-way valves 84 and 132 provide a flow path between the backwash water inlet port 136 and the backwash water outlet port 88, the respective 3-way valves 84 and 132 and the filter 94 are in an non-operating or backwash mode.

By means of control circuitry which will be described in greater detail subsequently, the first 3-way valve 84a and the second 3-way valve 132a have been placed in a non-operating or backwash mode while the first 3-way valves 84b-e and the second 3-way valves 132b-e have been placed in an operative mode to provide a flow path for the waste water 20 through the filter units 94b-e associated therewith.

The plurality of first 3-way valves 84 and the plurality of second 3-way valves 132 carry a like plurality of first limit switches 172 and a like plurality of second limit switches 176 and, in the exemplary embodiment, the first 3-way valves 84a-e are operatively associated with first limit switches 172a-e and the second 3-way valves 132a-e are operatively associated with second limit switches 176a-e.

The waste water 20 flows upwardly through the filter units 94b-e, through the respective 3-way valves 132b-e, and into a common filter discharge pipe 146 which connects the 3-way valves 132a-e in parallel.

The common filter discharge pipe 146 connects with a coalescer distribution T-fitting 150 through a shutoff valve 148 which allows the waste water pump 60 and the plurality of filter units 94 to be isolated from the remainder of the system S for maintenance or as otherwise required.

Figure 1B:
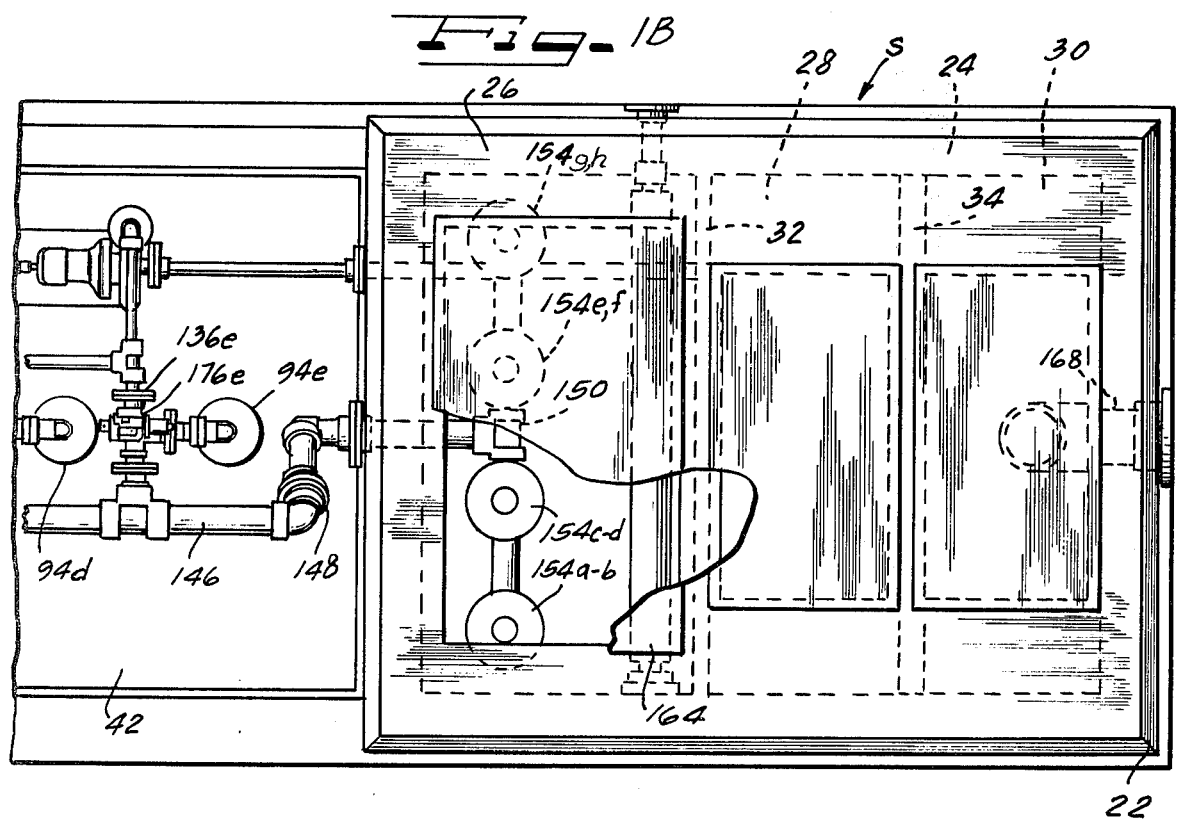
Figure 2A:
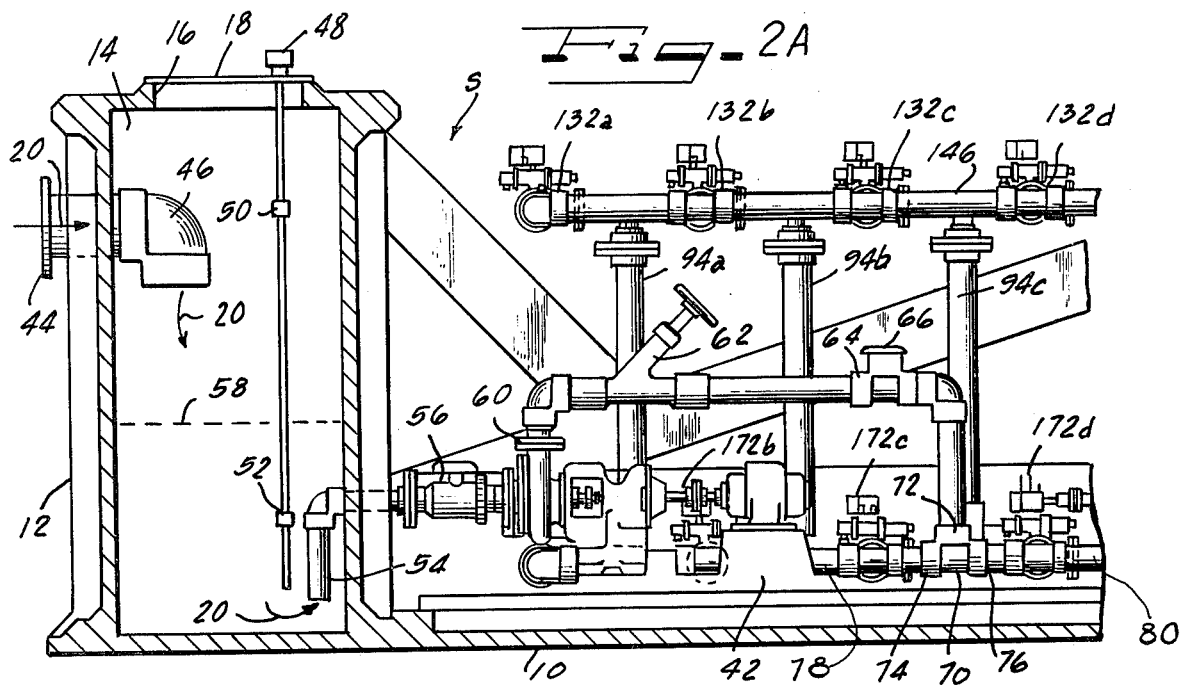
FIGS. 2A and 2B are a sectional elevational view of the system as shown in FIGS. 1A and 1B.
Figure 2B:
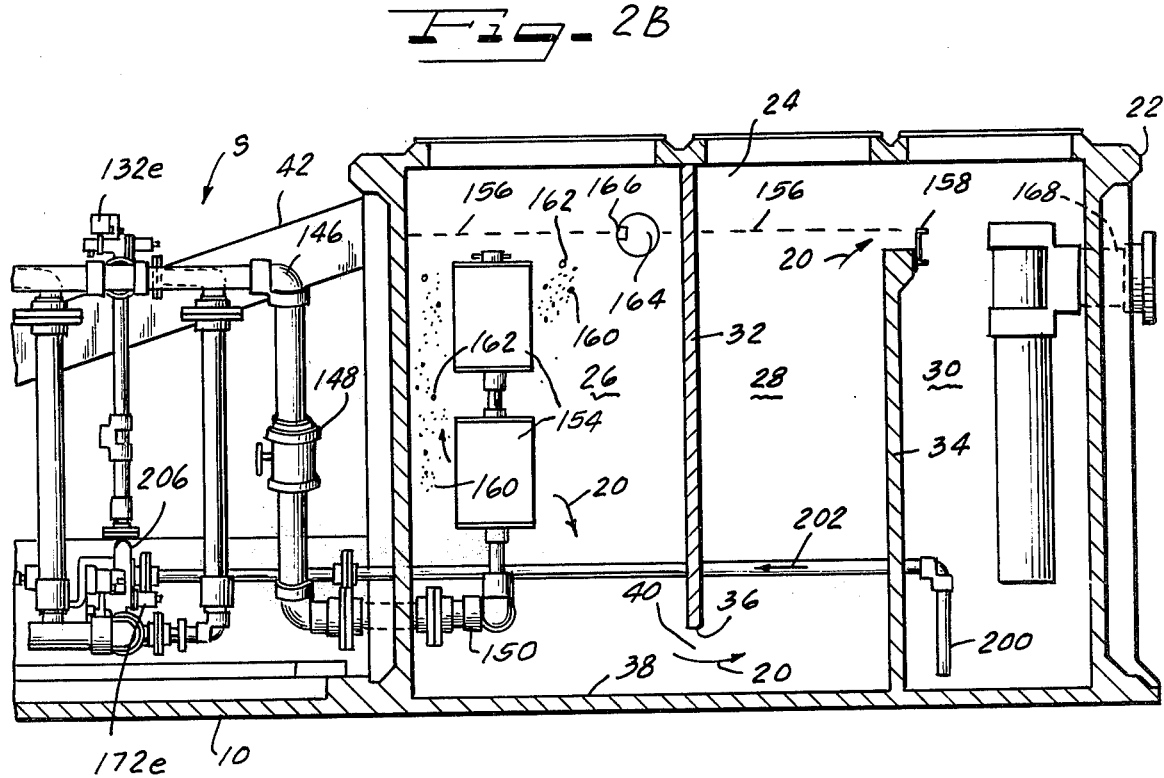

The T-fitting 150, located in the coalescing and oil accumulation portion 26 of the coalescing and outlet chamber 24, divides the flow of waste water 20 between a plurality of coalescer units 154 which, in the exemplary embodiment, includes four pairs of vertically stacked coalescers 154a-154b, 154c-154d, 154e-154f, 154g-154h; (FIGS. 1B, 2B and 3);

As the waste water 20 flows from the coalescers 154a-h and into the coalescing chamber 26, a level or surface 156 of the waste water 20 is maintained within a selected range by an adjacent top horizontal edge 158 carried by the weir partition 34.

In separating emulsified oils from the flow of waste water 20, there is provided within each coalescer unit 154 a separation member made of a material forming a collector surface of sufficient area on which particles of emulsified oil can adhere. Such a surface area is provided, as an example, by use of a fibrous material. Oil particles accumulate on the collecting surface to form oil droplets 160 increasing in size as additional oil particles adhere to the droplet 160. Additionally, the droplets 160 combine to form larger droplets 162. The waste water 20 flows through the coalescer units 154 from an inner longitudinal hollow core running the full height of each coalescer unit 154 to the outer circumferent surface. By the time the oil droplets 160 and 162 have reached the outer surface, these droplets have become sufficient in size that they float upward to the surface 156 of the waste water 20 in the coalescing and oil accumulation portion 26 because the droplets 160 and 162 have a lower specific gravity than the waste water 20.

Because the flow of waste water 20 and the flow of oil droplets 160 and 162 in the coalescing portion 26 are in different directions, i.e. oil droplets 160 and 162 float upward and accumulate on the surface 156 while the waste water 20 flows in a downward direction and through the opening 40 formed below the oil baffle retention portion 32, laminar flow must be maintained since turbulence could cause a remixing of the oil and water.

To ensure laminar flow and proper separation, the width and the length of the coalescing oil accumulation portion 26 must be sized with respect to the expected flow rate through the polishing system S. It has been found that in sizing the coalescing and oil accumulation portion, a ratio of area, i.e. width and length, to the rate of flow must be maintained. The depth of the tank is of little consequence. By using the formula:

$$\text{velocity} = \frac{\text{volume/time}}{\text{width} \times \text{length}}$$
or
$$\text{velocity, fpm} = \frac{\text{gallons/min.} \times 133}{\text{width (ft.)} \times \text{length (ft.)}}$$

the coalescing portion 26 may be properly sized ensuring laminar flow without requiring excessive space.

The oil droplets 160 and 162 accumulate on the surface 156 of the waste water 20 in the coalescing and oil accumulation portion 26 and are removed by a skimmer 164 having an elongated opening 166 therein positioned at an elevation approximately equal to the level 156 of the waste water 20 in the chamber 24. Oil skimmed from the surface 156 by the skimmer 164 flows to an externally located reservoir.

The waste water 20 flows downwardly and through the submerged opening 40 below the oil retention baffle partition 32 into the weir portion 34 and upwardly over the weir partition 28 to accumulate in the clean water portion 30 located at the outlet end 22 of the chamber 24. This water is then gravity fed or pumped from the clean water portion 30 by an outlet pipe 168 and can be reused or allowed to flow into a municipal sewer.

The polishing system S includes means for backwashing the plurality of the filter units 94 and includes a backwash intake 200 located in the clean water portion 30 of the coalescing and outlet chamber 24 to provide a source of backwash water 202. The intake 200 is connected to a suction inlet 204 of a backwash pump 206 having a discharge outlet 208 which in turn connects in parallel with the backwash inlet ports 136 of the plurality of second 3-way valves 132. In the exemplary embodiment, these ports have been identified by reference number 136a-e.

The backwashing means further includes a vacuum breaker 210 which is attached to each filter unit 94, and in the exemplary embodiment are identified as 210a-e. Each vacuum breaker 210 allows its associated filter unit 94 to be drained of the waste water 20 when the associated first and second 3-way valves 84 and 132 have placed the particular filter unit 94 in a non-operating or backwash mode. The waste water 20 in the particular filter unit 94 flows into a common backwash outlet line 212 which connects the backwash outlet ports 88a-e of the first 3-way valving means 84 in parallel with a system backwash discharge.

To facilitate efficient backwashing, the backwash pump 206 is of a size selected to deliver the backwash water 202 in a volume approximately exceeding by twenty percent the volume of the waste water 20 passing through the filter units 94. As an example, if the filter unit 94 has a normal capacity of 50 gpm, the backwash pump 206 may be of a size to deliver proximately 60 gpm.

The backwashing of the particular filter unit 94 is further enhanced by the fact that most all of the waste water 20 has been drained from the filter unit 96 before the backwashing water 202 enters the filter unit 96. Thus, when the foraminous or cloth filter 110 is first charged with the backwash water 202, there is only a minimum resistance to the removal of solids accumulated on the outer surface 120 of the cloth filter 110.

As solids accumulate in the filter units 94 on the fiber filters 120 surrounding the stainless steel cores of filters 110 during operation of the polishing system S, the pressure drop across the filter units 94 increases. Between the waste water pump 60 and the filter units 94 is a high level pressure switch 214 which at a selected value of pressure drop will start the backwashing cycle. The switch 214 is time sensitive so as to prevent an inadvertent actuation of the backwash cycle if there were to be a momentary pressure surge.

Upon sensing a selected high pressure drop level for a sufficient period of time, the pressure sensitive switch 214 actuates a stepping switch 216 having a series of cam actuators 218. The stepping switch 214 activates the first and second air valves 101a and 144a associated with the filter unit 94a through the actuators 100a and 142a to bring the 3-way valves 84a and 132a into the operative mode. Because of its previously non-operating condition, this filter unit 94a is clean and as a result, the pressure drop across the plurality of filter units 94 decreases to a level below the selected actuation value.

At the same time, the air valves 101b and 144b associated with the filter unit 94b are activated by the stepping switch 216 to bring the filter unit 94b into a non-operating or backwash mode by means of the actuators 100b and 142b through the first and second 3-way valves 84b and 132b. Upon completion of this change in mode of the filter unit 94b, the limit switch 172b and 176b associated with the filter unit 94b are closed to energize a backwash timer 220 which times out and resets. This time period is sufficient to allow waste water 20 within filter unit 94b to drain therefrom. The stepping switch 216 then advances to reenergize the backwash timer 220 which is also part of a power circuit to the backwash pump 206. The backwash pump 206 is thus energized for a selected time period as provided by the backwash timer 220 to flush the solid pollutants which have collected in the filters 110 in the filter unit 94b.

Upon completion of the backwash time period, the backwash pump 206 is de-energized and the stepping switch 216 advances to activate the air valve 101b and 144b associated with the filter unit 94b to return this filter unit 94b to an operative mode. At the same time, the stepping switch 216 activates the air valve 101c and 144c associated with the filter unit 94c to change its associated first and second 3-way valving 84c and 132c from a non-operating mode to an inoperative or backwash mode by the actuators 100c and 142c. Upon completion of this mode change, the limit switch 172c and 176c associated with the filter unit 94c are closed to energize the backwash timer 220 and thus allow the waste water 20 within the filter unit 94c to be drained therefrom. The stepping switch 216 then advances to again actuate the backwash pump 206 and the backwash timer 220 to flush solid pollutants within the filter unit 94c therefrom.

This procedure continues sequentially until the last filter unit, which in the exemplary embodiment is the filter unit 94e, is backwashed. Upon completion of the backwashing of the filter unit 94e, the cycle stops and the filter unit 94e remains in the non-operating or backwash mode.

Upon reactivation of the backwash cycle, the filter unit 94e is first brought on line and the filter units 94 backwashed in a reverse sequential manner.

The system S also includes a sump pump 230 located in the apparatus portion 42 containing the pumps 60 and 206, the filter units 94 and related piping. Thus, any waste water 20 escaping from the apparatus will be removed. The sump pump 230 is controlled by a probe 232. The circuitry to the sump 230 is time sensitive in that if it is required to operate for a selected length of time, i.e. 10 minutes, the system will be likewise shut down automatically. Such a condition could occur if there was a system failure casing a waste water leakage at a rate approximately equaling the output of the sump 230 or the control mechanism to shut off the sump became inactive.

An additional high level pressure switch 234 is located between the filter units 94 and the coalescer units 154. If pressure therebetween increases beyond a predetermined level, a warning signal is produced since an out-of-limit high pressure in all likelihood is the result of the coalescers 154 becoming fouled with suspended solids which had not been separated by the filter units 94.

While various modifications may be suggested by those versed in the art, it should be appreciated that I wish to embody within the scope of the patent warranted hereon, all such modifications as reasonably and properly come within the scope of my contribution to the art.

I claim as my invention:

1. A modular water polishing system for removing suspended solids and emulsified oils from a flow of waste water comprising,
   (a) a self-contained transportable support structure including a support platform,
   (b) a first, surge tank mounted on said platform and having supply means for charging a substantially continuous source of said waste water into the surge tank,
   (c) a second, coalescing and outlet tank carried by said platform and separated from said surge tank and connected to an outlet from said system,
   (d) pumping means carried by said support structure for pumping said waste water through an inlet communicating with said surge tank,
   (e) a plurality of first 3-way valves each having a first, second and third port, said first ports of said valves connected respectively in parallel to an output of said pumping means, said first 3-way valves having an operative flow path between said first port and said third port, and a backwash flow path between said third port and said second port,
   (f) a plurality of filter units mounted on said support structure outside of said tanks to remove said suspended solids from said flow and having a bottom appurtenance connected respectively to said third port of said first 3-way valves, (g) a plurality of second 3-way valves each having a first, second and third port, of which their first ports are connected respectively to a top appurtenance of said filter units, said second 3-way valves having an operative flow path between their first port and third port and a backwash flow path between their second port and their first port, (h) a plurality of coalescers to separate said suspended oils from said flow, and mounted in said second coalescing and outlet tank and communicating jointly with said third ports of said second 3-way valves, (i) oil accumulation means for collecting coalesced oils comprising a first widthwise partition mounted in said second tank and having a bottom edge spaced above the bottom of such tank to provide a submerged outlet for said flow of waste water, and a second widthwise partition mounted in said second tank spaced from said first partition and having a top horizontal edge to provide an overflow weir for said waste water flow into a clean water chamber separated from the remainder of the second tank by said second partition, said top edge selectively positioned to maintain a liquid level in said second tank to maintain said coalescers in a submerged condition within said second tank, (j) backwashing means to remove separated solids from said filter units, said backwashing means including,
an intake in said clean water chamber connecting to a backwash pump,
a first backwash line communicating an outlet of said backwash pump in parallel to said second ports of said second 3-way valves, respectively, and
a second backwash line connecting in parallel said second port of said first 3-way valves, (k) actuating means comprising a first set of actuators carried by and operatively connected to said first 3-way valves for selectively opening and closing said operative and backwash flow paths in said first and second valves, (l) said actuating means comprising a second set of actuators carried by and operatively connected to said second 3-way valves cooperating with said first set of actuators to selectively open and close said operative and backwash flow paths in said first and second valves, (m) control means operatively connected to said actuating means to selectively activate said actuating means and place a part of said plurality of said first and second 3-way valves and the associated filter unit in a backwash mode and a remainder of said first and second 3-way valves and associated filter units in an operative mode, wherein said actuators are selectively operated by said control means to change said 3-way valves from an operative mode to a backwash mode to allow selective backwashing of individual filter units while the system continues to operate through all other of said filter units and uninterruptedly through said coalescers.

2. A water polishing system as defined by claim 1 and further including, a set of vacuum release means comprising a plurality of vacuum breakers carried by said filter units respectively, wherein upon a respective filter being in a backwash mode, entrapped waste water drains from said unit to provide an unrestricted flow path for backwash water entering said filter unit.

3. A water polishing system as defined by claim 1 and further characterized by, said coalescing and outlet tank being selectively sized with respect to a rate of flow of said waste water from said coalescers to ensure said flow has laminar characteristics.

4. A water polishing system as defined by claim 1 and further characterized by, said support structure and said first and second tanks having an integral construction including a urethane core sandwiched between an outer layer of reinforced resin to form a waterproof and weather-resistant construction in modular form.

5. A water polishing system as defined by claim 1 and said control means further including, a source of electrical power, a high level pressure switch for sensing a back pressure of said waste water flow between said pumping means and said filter units, said switch actuated when said pressure exceeds a selected high limit, a stepping switch device connected to said high level pressure switch and including a plurality of cam switches, air valving means including a plurality of first and second air valves connected respectively to said plurality of first and second actuators, said air valves having a first state to place said first and second 3-way valves in an operative mode and a second state to place said first and second 3-way valves in a backwash mode, said stepping switch device connected respectively to said air valves, a plurality of first and second limit switches respectively carried by and operatively connected to said first and second 3-way valves and responsive to said valves being in said operative mode or said backwash mode, and a timing device connected to said source of electrical power and said backwash pump through said stepping switch device and said limit switches to be selectively activated by said power source and selectively connecting said pump to said power source and causing energization thereof, whereupon said back pressure of said waste water exceeding said selected high limit, said pressure switch actuating said stepping switch device which in turn activates said air valving means associated with said part of said first and second 3-way valves in a backwash mode to change said part to an operative mode and at the same time activating said air valves associated with a first associated filter unit in an operative mode to change said mode to a backwash mode, said first and second limit switches associated with said first filter unit being actuated to start said timer for a selected time period to allow said waste water in said first filter unit to drain therefrom, said timer advancing said stepping switch device upon completion of said time period to energize said backwash pump and said timer for said selected time period, said timer advancing said stepping switch device upon completion of said time period to reactivate said air valving associated with said first filter unit to return said first filter unit to an operative mode and at the same time to activate said air valving associated with a second filter unit in an operative mode to a backwash mode, wherein a remainder of filter units of said part in an operative mode are selectively and individually changed to a backwash mode, backwashed and returned to an operative mode, except the last filter unit remaining in a backwash mode.

6. A water polishing system as defined by claim 1 and further including, skimming means to remove collected oils, and comprising a skimmer carried by sidewalls of said second tank between said plurality of coalescers and said first widthwise partition, said skimmer having an elongated overflow edge located at an elevation approximating an elevation of a surface of said waste water in said tank, and oil discharge means connected to said skimmer means to provide a flow path for said skimmed oil from said second system.

7. A system according to claim 1 and further including control means comprising, a power source, a high level pressure switch carried by said system for sensing a pressure of said waste water between said second 3-way valves and said coalescers, said switch having contacts which close when said pressure exceeds a selected high pressure limit, and a warning device for producing a warning signal, said device connected to said power source through said high level switch, wherein said warning device produces a warning signal upon said pressure of said waste water exceeding said high pressure limit.

8. A system according to claim 1 and further including, a power source, a sump pump mean carried by said support structure, a sump pump circuit connecting said power source to said pump, a water level control sensing means having probes responsive to contact with water, and connected in said sump pump circuit to selectively allow energization of said pump, a time delay device having a selected time delay period, said device connected in said sump pump circuit and activated thereby to shut down said system upon said lapse of said time period.

9. A method of continuously removing suspended solids and emulsified oils from a flow of waste water comprising the following steps, a. drawing said flow of waste water through an inlet in said system by a pump means, b. piping said pumped waste water from said inlet to said pump means, c. pumping said waste water through said pump means to a plurality of first 3-way valving means connected in parallel with said pump means, d. actuating said first 3-way valving means to place a part of said first means in an operative mode and a remainder of said valving means in a backwash mode, e. pumping said waste water through said first valving means in an operative mode to a plurality of filter means connected thereto, f. filtering said waste water in said filtering means to separate said solids, g. pumping said waste water from said filtering means to a plurality of second 3-way valving means, h. actuating said second 3-way valving means to place a like part of said second valving means in an operative mode and a like remainder of said valving means in a backwash mode, i. piping said waste water from said second 3-way valves in an operative mode to a plurality of coalescers connected jointly through a common connection with said plurality of second 3-way valves, j. coalescing said water in said coalescers to cause said emulsified oil to form into floatable droplets, k. submerging said coalescers in a body of said waste water, l. floating said oil droplets to a top surface of said body of waste water to form an accumulation, m. skimming said accumulated oil droplets from said surface with a skimming means, n. draining said body of water at a controlled rate from said system, o. and continuing said coalescing of said oil in said coalescers without interruption during backwashing of any part of said filtering means through the operation of said 3-way valves.

10. A method according to claim 9 and further characterized as including the following steps of backwashing:

1. sensing a pressure of said waste water between said pumping means and said filter means with a pressure sensitive switch, 2. producing an output from said switch upon said sensed pressure exceeding a selective limit, 3. communicating said output to a stepping switch device connected in a power supply circuit to activate said step switching device, 4. actuating said first and second 3-way valving means in a backwash mode to transform said means to an operative mode by activating actuator means operatively connected to said switching means and said 3-way valving means associated therewith, 5. actuating a part of said first and second 3-way valving means in an operative mode to transform said part to a backwash mode by activating actuator means operatively connected to said switch means and 3-way valving means associated therewith, 6. draining said waste water from said filter unit connected to said first and second 3-way valving means transformed from said operative mode to said backwash mode, 7. energizing a backwash pumping means for a selected time period to draw backwash water from said body of water into said backwash pump, 8. pumping said backwash water for said selected time period from said backwash pump through said filter unit in a backwash mode, 9. de-energizing said backwash pump after completion of said selected time period, 10. activating said actuators operatively connected to said part of said first and second 3-way valving means in said backwash mode to return said valving means to an operative mode, 11. backwashing said remaining filtering means in a sequential manner until all said filter means have been backwashed.

11. A system for removing solid pollutants as well as lower specific gravity suspended liquid pollutants from a flowing liquid in a continuous manner, comprising:
(a) a system support structure,
(b) liquid pumping means for drawing said liquid into said system,
(c) filtering means including a plurality of filter units connected in parallel to said pumping means to receive an output therefrom and remove said solid pollutants from said liquid by mechanical filtration,
(d) valving means connected to said plurality of filter units to selectively allow said liquid to pass through a filter unit or allow passage of backwashing liquid through said filter unit in a reverse direction while any remaining filter unit remains in operation for mechanical filtration,
(e) a liquid chamber downstream from said filter units and having means for skimming lower specific gravity liquid pollutants from adjacent the top of the chamber and also means for discharge of clarified liquid from the lower part of the chamber,
(f) a plurality of coalescers jointly connected to receive filtered liquid from all of said plurality of filter units and operating to effect continuous coalescing and separating of said suspended liquid pollutants from the liquid, said coalescers being submerged in said chamber and discharging said liquid and coalesced lower specific gravity liquid pollutants into said chamber for rising of the coalesced lower gravity liquid pollutants to the top of said chamber for removal therefrom,
(g) backwashing means carried by said support structure and including a backwash pump to selectively pump backwash liquid through said filter units under the control of said valving means for removing said solid pollutants from the filter units, and
(h) means for controlling said backwash pump and said valving means to effect backwashing of said filter units in a selective sequential manner so that said any remaining filter unit continues in operation for removal of said solid pollutants and all of said coalescers remain in operation to effect coalescing and separating of said lower specific gravity liquid pollutants from said liquid without interruption during selective backwashing of said filter units.

12. A compact modular apparatus embodying a polishing system for removing solid pollutants and coalescible organic pollutants from a flowing liquid, comprising:
a self-supporting mobile support structure having a supply tank with an inlet for receiving polluted liquid and an outlet located relative to the inlet to assure substantially surge-free flow of the liquid from the supply tank;
mechanical filtering means supported by said support structure outside of said supply tank and connected with said outlet to receive the liquid for filtering solid pollutants from the liquid;
a second tank supported by said support structure and subdivided by partitions into a coalescing portion, a weir portion and a clean water portion and adapted to have a maintained common horizontal liquid level in said coalescing and weir portions;
said second tank having a first partition extending from above the liquid level toward the bottom of the second tank and providing adjacent to the bottom of the second tank a free liquid flow communication with the lower end of said weir portion of the second tank, and said weir portion having a second partition extending upwardly from the tank bottom between and separating said weir portion and said clean water portion and having means on its upper end for controlling the liquid level in said coalescing and weir portions, and said clean liquid portion having means for withdrawing clean liquid therefrom;
means connected to said filtering means to receive all of the filtered liquid therefrom and operating to coalesce organic pollutants and discharge the coalesced organic pollutants and liquid into said coalescing portion of the second tank so that the coalesced organic pollutants will rise to the liquid level in the coalescing portion of the second tank for removal therefrom and the clarified liquid will flow downwardly in the coalescing portion of the second tank and under said first partition into said weir portion and thence upwardly and spill over said second partition into said clean liquid portion for withdrawal by said withdrawal means;
and means for controlling said filtering means selectively in part for backwashing and cleaning while maintaining the remainder of the filtering means in continuous operation and continuous communication with said coalescing means to maintain the coalescing means in continuous operation while said part of the filtering means is being backwashed and cleaned.

13. Apparatus according to claim 12, including means effecting communication with said clean liquid portion of said second tank for supplying backwashing water from said clean liquid portion to said filtering means, and means controlling backwashing of said filtering means by the clean liquid derived from said clean liquid portion through said means effecting communication.

14. A self-contained water polishing system for removing pollutants from a flow of waste water, comprising:
modular portable supporting structure and tank means supported thereon and having means for connection with a source of waste water upstream and a receiver for cleaned water downstream;
said tank means having separate coalescer and clean water chambers;
filtering means carried by said support structure outside of said tank means and comprising a plurality of filters to remove suspended solids;
means connecting said filtering means in communication with said waste water source;
a plurality of coalescers in submerged relation within said coalescer chamber of said tank means and having a common connection communicating with said filtering means to receive all of the water filtered in said filters and said coalescers operating to coalesce coalescible pollutants from the water from which suspended solids have already been removed by the filters and to discharge the coalesced pollutants and water into the coalescer chamber;
means between said coalescer chamber and said clean water chamber for maintaining a water level therein above the coalescers;
means for skimming coalesced pollutants from the water level;
means for effecting passage of clean water from said coalescer chamber substantially below said coalescers and into said clean water chamber to avoid coalesced pollutants from passing to said clean water chamber;

means for effecting circulation of said waste water from said source through said filters and into said coalescers;

and means for effecting selective backwashing of any part of said filters without interrupting the continuous circulation of water through the remainder of the filters and said coalescers.

15. A water polishing system for removing solid and coalescible pollutants from flowing water, comprising:

a plurality of mechanical filters for filtering solid pollutants from the water;

means for connecting the filters to a source of water carrying the pollutants;

coalescer and clean water discharge tank means;

a plurality of coalescers at a substantial elevation have a bottom in said tank means;

means for maintaining a water level in said tank means substantially above said coalescers;

means providing a connection with all of said filters in common to all of said coalescers so that water from which solid pollutants have been removed by any of the filters is transported to all of the coalescers jointly;

said coalescers being continuously operative to coalesce coalescible pollutants from the solid-pollutants-free water received from the filters and discharging the coalesced pollutants and water from the coalescers into said tank means whereby the coalesced pollutants rise to the liquid level in the tank means;

means for drawing off coalesced pollutants from said liquid level;

means for effecting passage of substantially clean water from said coalescers downwardly in the tank means for discharge from the tank means substantially free from coalesced pollutants;

and means for selectively placing any one of the filter units in backwashing mode while any remaining filter continues in filtering mode supplying substantially solid pollutant free water to the coalescers so that coalescing and discharge of coalesced pollutants and water from the coalescers continues uninterruptedly during said selective backwashing.

16. A system according to claim 14, wherein said coalescers comprise a set in respectively spaced relation from one another in said tank means.

17. A system according to claim 14, wherein said coalescers are in vertically aligned connected pair relationship.

18. A system according to claim 14, wherein said coalescers comprise a plurality of relatively spaced connected vertical pairs of coalescers.

* * * * *

UNITED STATES PATENT AND TRADEMARK OFFICE
CERTIFICATE OF CORRECTION

PATENT NO. : 4,162,973
DATED : July 31, 1979
INVENTOR(S) : William M. Lynch

It is certified that error appears in the above-identified patent and that said Letters Patent are hereby corrected as shown below:

Column 7, line 64, for "a non-operating mode to an inoperative" read --an operative mode to a non-operative--.

Column 11, line 6, delete "of said part".

Column 11, line 63, "said first means" should read --said first valving means--.

Column 15, line 18, for "have" read --above--.

*Signed and Sealed this*

*Twentieth* Day of *November 1979*

[SEAL]

Attest:

RUTH C. MASON
*Attesting Officer*

LUTRELLE F. PARKER
*Acting Commissioner of Patents and Trademarks*